US012518788B2

(12) United States Patent
Biskeborn et al.

(10) Patent No.: US 12,518,788 B2
(45) Date of Patent: Jan. 6, 2026

(54) HIGH CAPACITY CAPTIVE TAPE DRIVE

(71) Applicant: Western Digital Technologies, Inc., San Jose, CA (US)

(72) Inventors: Robert G. Biskeborn, Hollister, CA (US); Masahito Kobayashi, Fujisawa (JP); Trevor W. Olson, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 188 days.

(21) Appl. No.: 18/229,774

(22) Filed: Aug. 3, 2023

(65) Prior Publication Data

US 2024/0420736 A1 Dec. 19, 2024

Related U.S. Application Data

(60) Provisional application No. 63/521,818, filed on Jun. 19, 2023.

(51) Int. Cl.
*G11B 15/18* (2006.01)
*G11B 5/008* (2006.01)
*G11B 15/32* (2006.01)
*G11B 15/66* (2006.01)
*G11B 23/087* (2006.01)

(52) U.S. Cl.
CPC ...... *G11B 15/1808* (2013.01); *G11B 5/00826* (2013.01); *G11B 15/32* (2013.01); *G11B 15/66* (2013.01); *G11B 23/087* (2013.01); *G11B 23/08757* (2013.01)

(58) Field of Classification Search
None
See application file for complete search history.

(56) References Cited

U.S. PATENT DOCUMENTS

| 2,481,398 | A | * | 9/1949 | Danisch | G11B 5/584 360/91 |
| 2,821,576 | A | * | 1/1958 | Gaubert | G11B 23/087 360/75 |
| 3,758,730 | A | * | 9/1973 | Rothschild et al. | G11B 15/32 242/337 |
| 3,819,130 | A | * | 6/1974 | Moxness | G11B 23/04 242/337.1 |
| 11,043,237 | B2 | * | 6/2021 | Biskeborn et al. | G11B 15/1808 |
| 11,232,815 | B2 | * | 1/2022 | Biskeborn et al. | G11B 15/32 |

* cited by examiner

*Primary Examiner* — Craig A. Renner
(74) *Attorney, Agent, or Firm* — Patterson + Sheridan, LLP

(57) ABSTRACT

The present disclosure generally relates to a captive tape drive comprising a tape head. The captive drive comprises an upper assembly, the upper assembly comprising a first tape, a first supply reel, a first take-up reel, and two or more rollers. The captive tape drive further comprises a lower assembly disposed below the upper assembly, the lower assembly comprising a second tape, a second supply reel, a second take-up reel, and two or more rollers. The tape head is disposed between the plurality of rollers, and is configured to move between the upper assembly and the lower assembly to access the first and second tapes. The tape head comprises one or more modules, each module comprising 64 writers and 64 readers. Each module is configured to write data to the first and second tapes using the 64 writers and to read verify the newly written data using the 64 readers.

22 Claims, 11 Drawing Sheets

HIGH CAPACITY CAPTIVE TAPE DRIVE

CROSS-REFERENCE TO RELATED APPLICATIONS

This application claims benefit of U.S. provisional patent application Ser. No. 63/521,818, filed Jun. 19, 2023, which is herein incorporated by reference.

BACKGROUND OF THE DISCLOSURE

Field of the Disclosure

Embodiments of the present disclosure generally relate to a tape head and a captive tape drive including the tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

In tape drives, the magnetic media or tape is often removable, such that it can be replaced or stored. As such, the tapes are often unable to store large amounts of data, as the tapes are intended to be replaced. Furthermore, tapes that are stored may stretch and/or compress both in tape length and width over time, referred to as tape dimensional stability (TDS) effects, due to a variety of reasons, such as environmental causes like humidity and temperature, workload, and general wear of the tape. As the tape stretches and compresses, the positioning information in the servo tracks may become outdated, thus making accurate positioning of the tape head difficult.

Therefore, there is a need in the art for a tape drive capable of compensating for tape dimensional stability effects while increasing the amount of data stored within the tape drive.

SUMMARY OF THE DISCLOSURE

The present disclosure generally relates to a captive tape drive comprising a tape head. The captive tape drive comprises an upper assembly, the upper assembly comprising a first tape, a first supply reel, a first take-up reel, and two or more rollers. The captive tape drive further comprises a lower assembly disposed below the upper assembly, the lower assembly comprising a second tape, a second supply reel, a second take-up reel, and two or more rollers. The tape head is disposed between the plurality of rollers, and is configured to move between the upper assembly and the lower assembly to access the first and second tapes. The tape head comprises one or more modules, each module comprising 64 writers and 64 readers. Each module is configured to write data to the first and second tapes using the 64 writers and to read verify the newly written data using the 64 readers.

In one embodiment, a tape drive comprises an enclosure, an upper assembly disposed within the enclosure, the upper assembly comprising: a first supply reel, a first take-up reel, one or more first rollers disposed between the first supply reel and the first take-up reel, and a first tape, a lower assembly disposed adjacent to the upper assembly within the enclosure, the lower assembly comprising: a second supply reel, a second take-up reel, one or more second rollers disposed between the second supply reel and the second take-up reel, and a second tape, and a tape head disposed between the one or more first rollers and the one or more second rollers within the enclosure, wherein the tape head comprises one or more modules, each module comprising a plurality of writers and a plurality of readers.

In another embodiment, a tape drive comprises an upper supply reel, an upper take-up reel disposed adjacent to the upper supply reel in a first direction, a first roller disposed adjacent to the upper supply reel, a second roller disposed between the upper take-up reel and the first roller, wherein the upper supply reel, the upper take-up reel, and the first and second rollers are configured to support a first tape, a lower supply reel disposed adjacent to the upper supply reel in a second direction perpendicular to the first direction, a lower take-up reel disposed adjacent to the lower supply reel in the first direction, a third roller disposed adjacent to the lower supply reel, a fourth roller disposed between the lower take-up reel and the third roller, wherein the lower supply reel, the lower take-up reel, and the third and fourth rollers are configured to support a second tape, and a tape head disposed between the first, second, third, and fourth rollers, wherein the tape head comprises one or more modules, each module comprising a plurality of writers and a plurality of readers.

In yet another embodiment, a tape drive comprises an upper assembly, the upper assembly comprising: a first supply reel, a first take-up reel, one or more first rollers disposed between the first supply reel and the first take-up reel, and a first tape, a lower assembly disposed adjacent to the upper assembly, the lower assembly comprising: a second supply reel, a second take-up reel, one or more second rollers disposed between the second supply reel and the second take-up reel, and a second tape, a tape head disposed between the one or more first rollers and the one or more second rollers, wherein the tape head comprises two modules, each module comprising a plurality of writers and a plurality of readers, and wherein the tape head is configured to write data to each of the first and second tapes using the plurality of writers and to read verify newly written data using the plurality of readers, means for moving one or more of the first tape or the second tape in a first direction and a second direction opposite the first direction, and means for moving the tape head in a third direction perpendicular to the first direction and a fourth direction opposite the third direction.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 illustrates a MFS view of a tape head comprising two SGV modules of

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a captive tape drive comprising a tape head. The captive tape drive comprises an upper assembly, the upper assembly comprising a first tape, a first supply reel, a first take-up reel, and two or more rollers. The captive tape drive further comprises a lower assembly disposed below the upper assembly, the lower assembly comprising a second tape, a second supply reel, a second take-up reel, and two or more rollers. The tape head is disposed between the plurality of rollers, and is configured to move between the upper assembly and the lower assembly to access the first and second tapes. The tape head comprises one or more modules, each module comprising 64 writers and 64 readers. Each module is configured to write data to the first and second tapes using the 64 writers and to read verify the newly written data using the 64 readers.

Figure 1A:
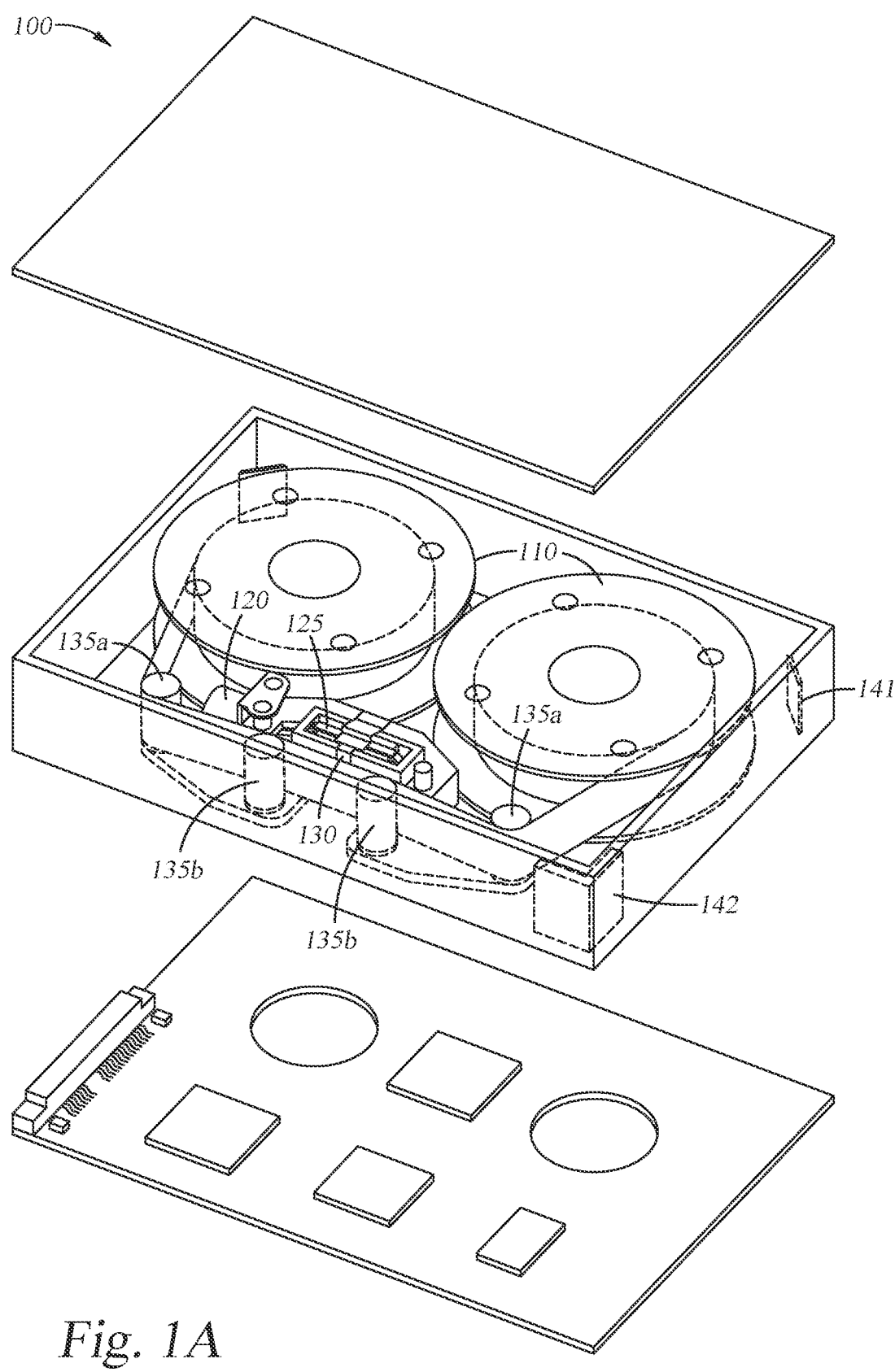
FIGS. 1A-1C illustrate a perspective exploded view, a simplified top down, and side profile view of a tape drive, in accordance with some embodiments.
Figure 1B:
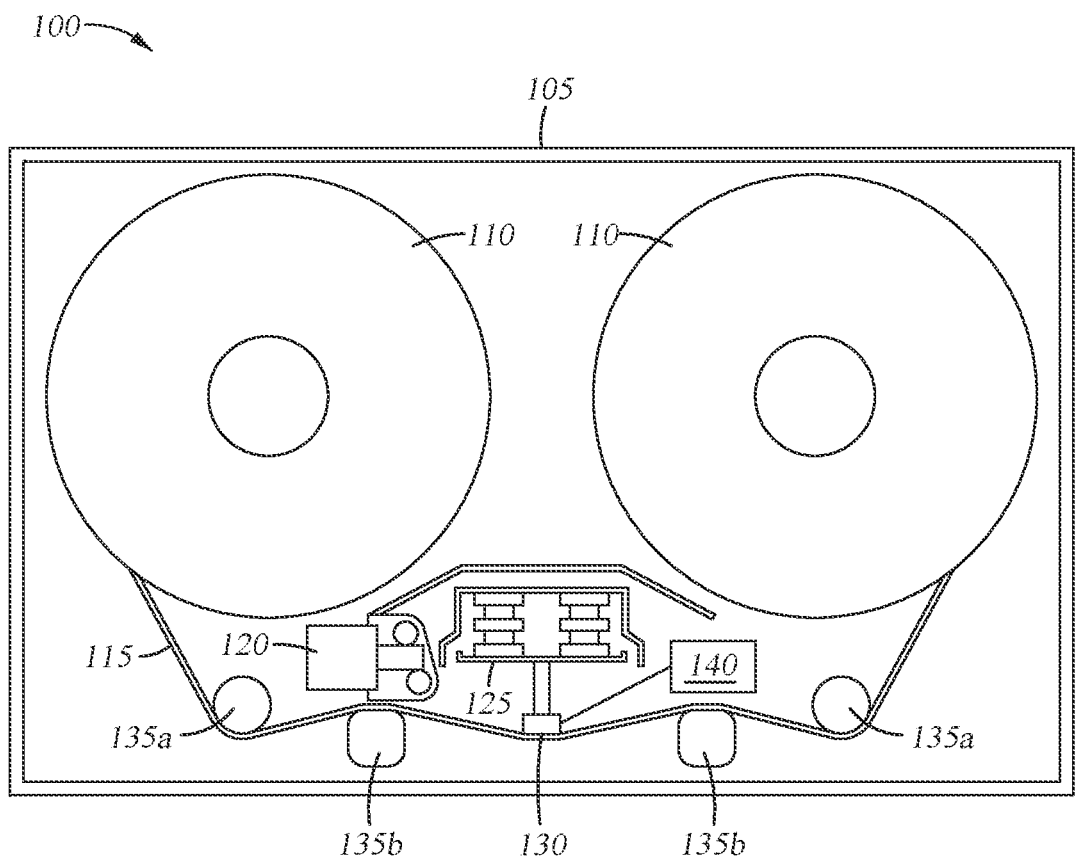
Figure 1C:
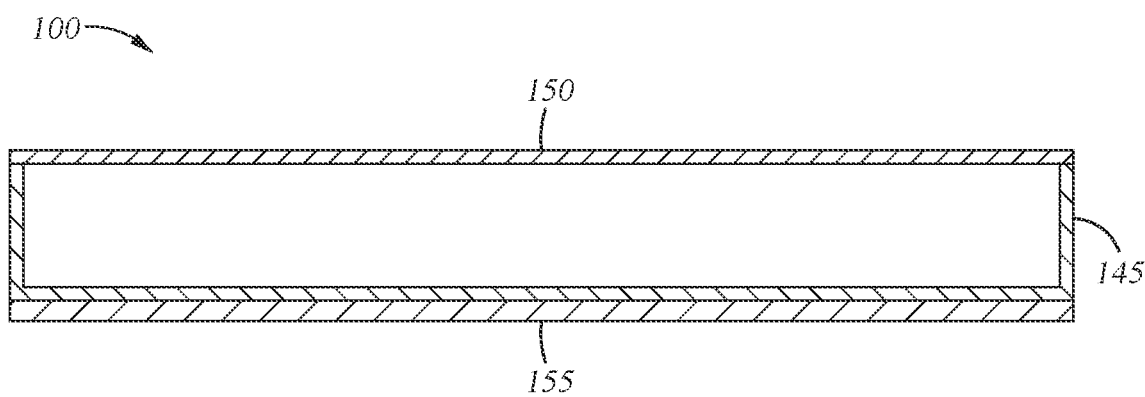

FIGS. 1A-1C illustrate a perspective exploded view, a simplified top down, and side profile view of a tape drive 100, in accordance with some embodiments. The tape drive 100 may be a captive tape drive. Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable and are not necessarily part of the tape drive 100. In such embodiments, the tape or media 115 is contained therein and so is removable from the drive 100, such as for replacement or otherwise servicing. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
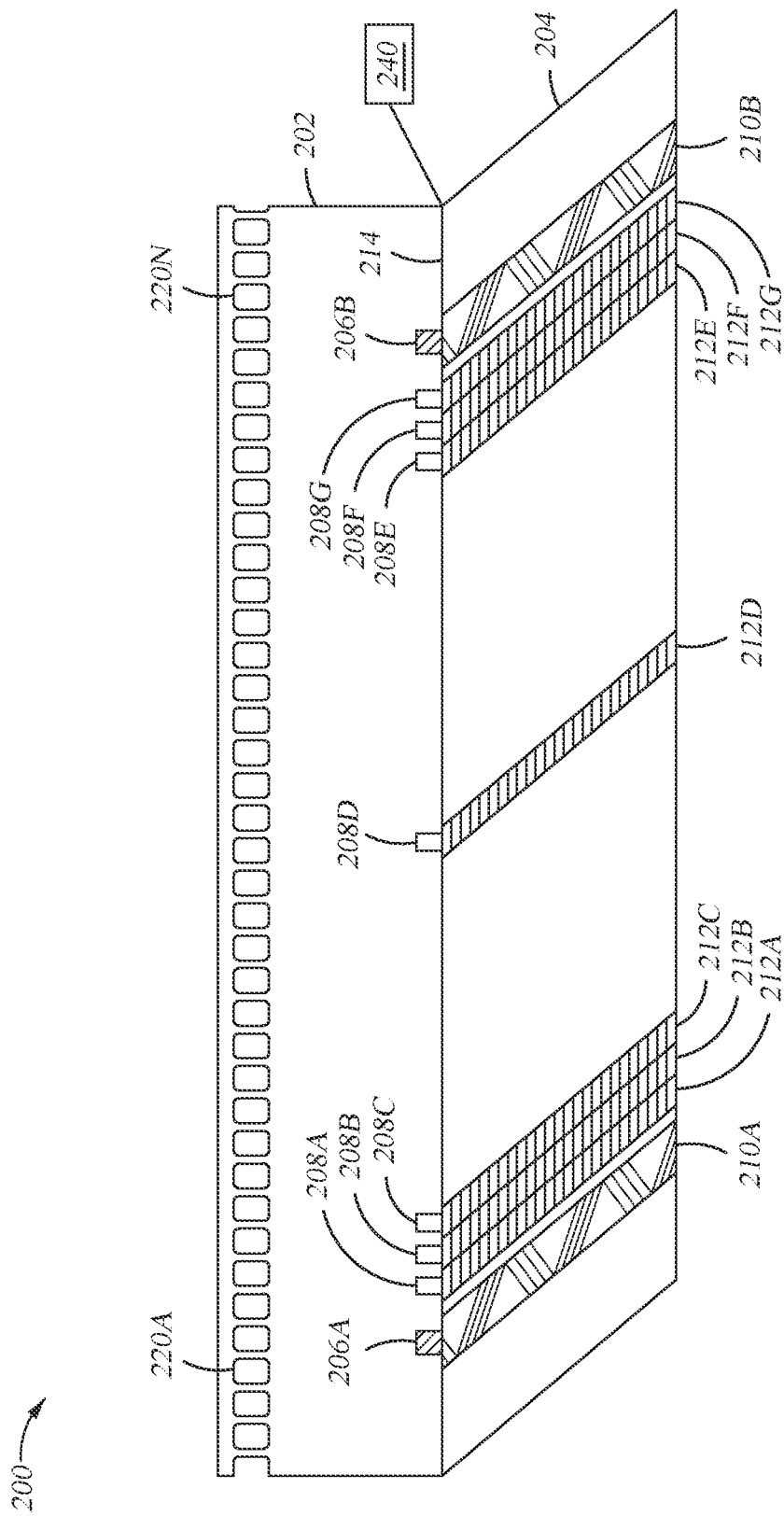
FIG. 2 is a schematic illustration of a tape head and tape that are aligned.

FIG. 2 is a schematic illustration of a tape head module assembly 200 and a tape 204 that are aligned. The tape head module assembly 200 comprises a tape head body 202 that is aligned with the tape 204. The tape 204 moves past the tape head module assembly 200 during read and/or write operations. The tape head module assembly 200 has a media facing surface (MFS) 214 that faces the tape 204. The tape head module assembly 200 is coupled to a controller, which may be the controller 140 of FIG. 1.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data head (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
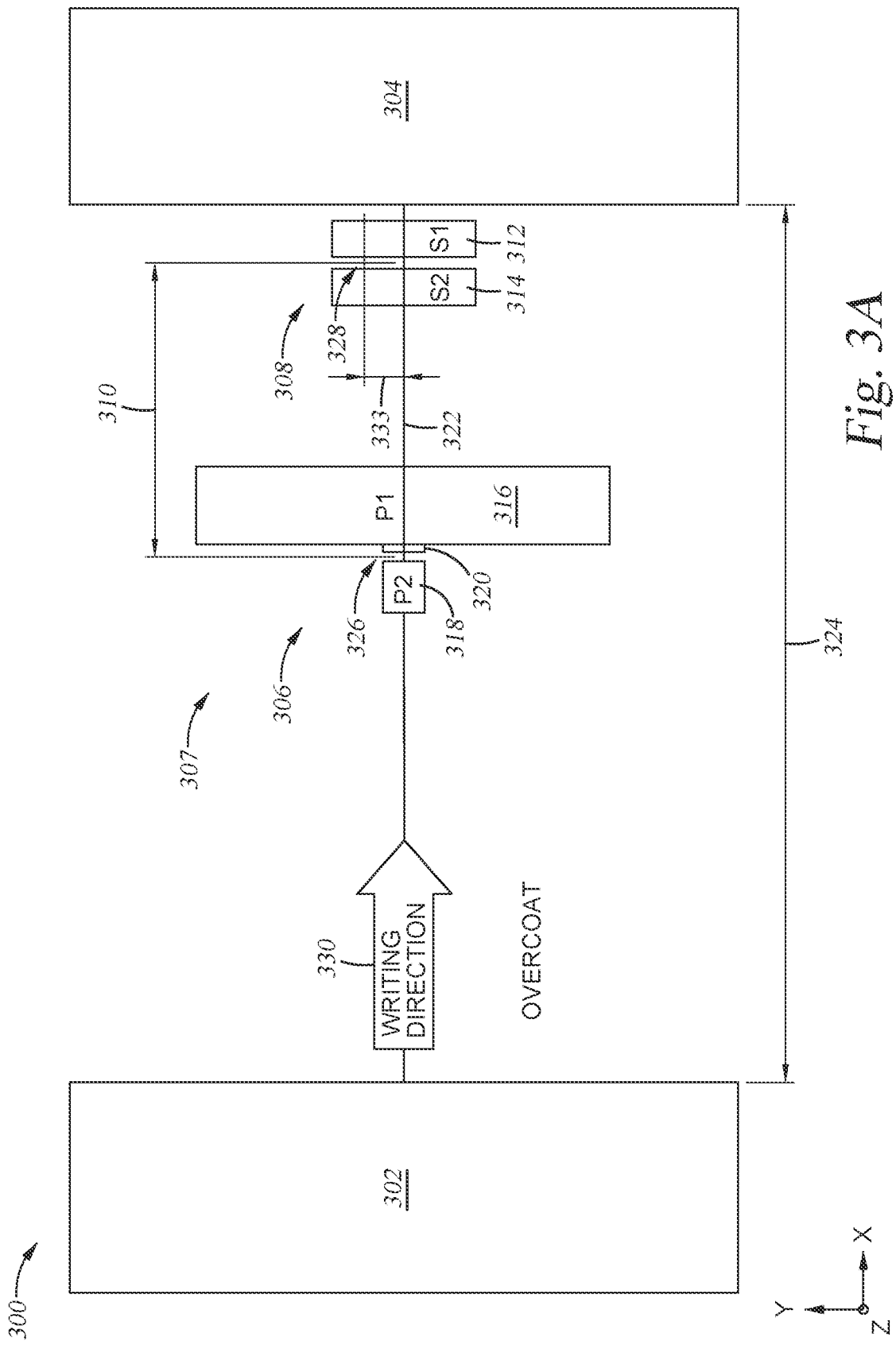
FIGS. 3A-3B illustrate a media facing surface (MFS) view of same gap verify (SGV) modules, configured to dynamically tilt, according to various embodiments.
Figure 3B:
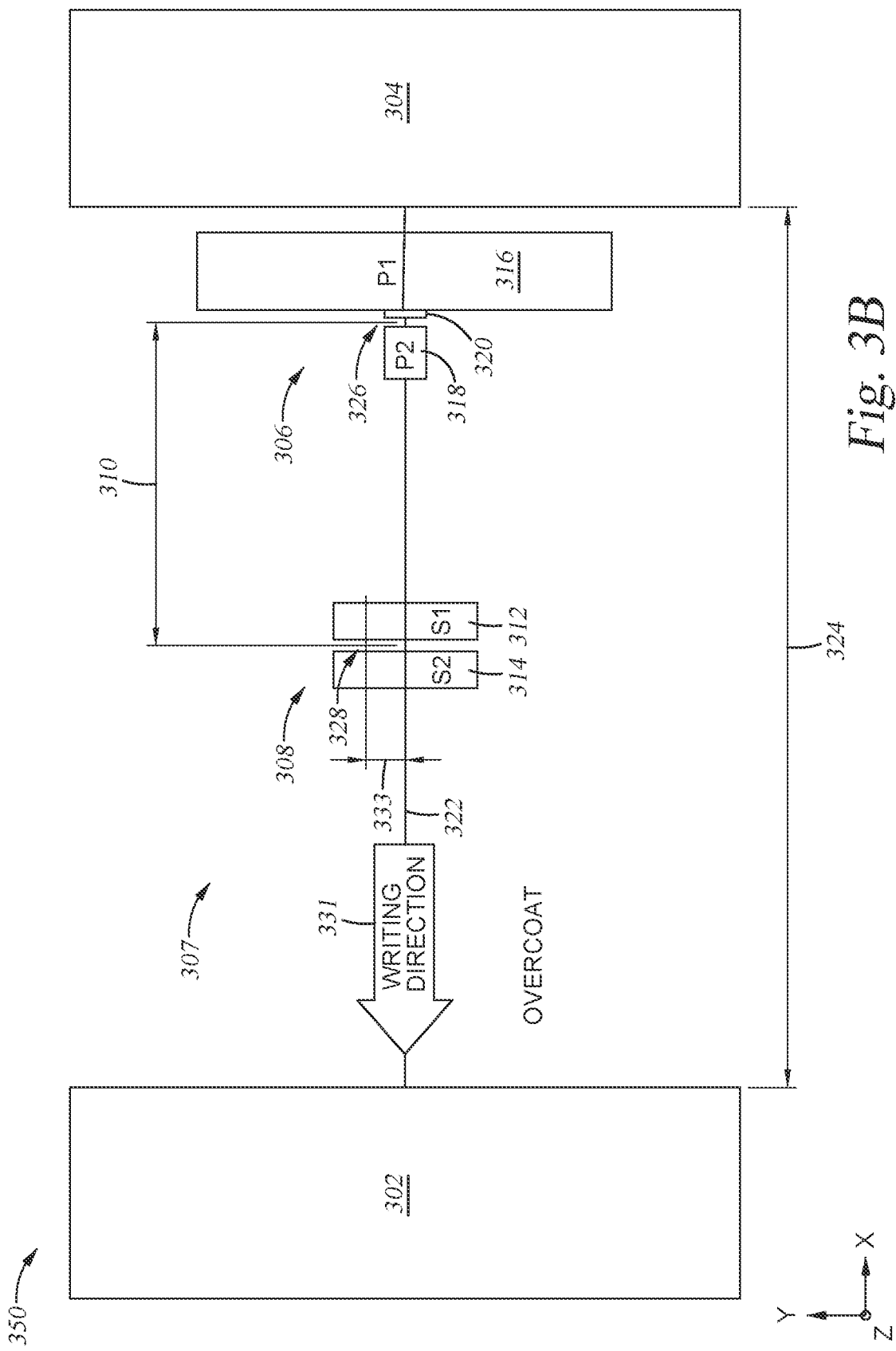

FIGS. 3A-3B illustrate a media facing surface (MFS) view of same gap verify (SGV) modules 300, 350, respectively, configured to dynamically tilt, according to various embodiments. The SGV modules 300, 350 may be utilized within a tape drive comprising a controller, such as the captive tape drive or tape drive 100 of FIG. 1A. The SGV modules 300, 350 utilized with, or be a part of, the tape head module 200 of FIG. 2. In FIGS. 3A-3B, the SGV modules 300, 350 are shown in an un-tilted configuration.

While SGV embodiments are shown in FIGS. 3A-3B, it is noted that the single beam tape head embodiments disclosed herein are applicable for non-SGV modules as well. Such non-SGV modules may include modules that have multiple reader, writer and servo elements such as the reader element is not used to verify data written by corresponding writer element of the same module.

The SGV module 300 comprises a closure 302, one or more write transducers 306 disposed adjacent to the closure 302, one or more read transducers 308 disposed adjacent to the one or more write transducers 306, and a substrate 304 disposed adjacent to the one or more read transducers 308. The SGV module 350 comprises a closure 302, one or more read transducers 308 disposed adjacent to the closure 302, one or more write transducers 306 disposed adjacent to the one or more read transducers 308, and a substrate 304 disposed adjacent to the one or more write transducers 306. Each of the one or more write transducers 306 and the one or more read transducers 308 are disposed on the substrate 304. The write transducer(s) 306 may be referred to as a writer(s) 306 or write element(s) 306, and the read transducer(s) 308 may be referred to as a reader(s) 308 or read element(s) 308.

While only one writer 306 and one reader 308 pair is shown in FIGS. 3A-3B, the SGV module 300 may comprise a plurality of writer 306 and reader 308 pairs, which may be referred to as a head array. For example, in some embodiments, as discussed below, the SGV modules 300, 350 each comprises a head array of 64 writers 306 and 64 readers 308, forming 64 writer 306 and reader 308 pairs, along with a plurality of servo readers (not shown).

In each of the SGV modules 300, 350, a writer 306 is spaced a distance 310 from a reader 308 of about 6 μm to about 20 μm, such as about 6 μm to about 15 μm. In embodiments comprising a plurality of writer 306 and a plurality of reader 308 pairs, each writer 306 is spaced the distance 310 from an adjacent paired reader 308. The closure 302 is spaced a distance 324 from the substrate 304 of about 20 μm to about 60 μm. In some embodiments, a shield (not shown) is disposed between the writer 306 and the reader 308 of each pair to reduce cross-talk signals to the reader 308 from the writer 306.

Each of the writers 306 comprises a first write pole P1 316 and a second write pole P2 318. A notch 320 may be disposed on the P1 316. The notch 320 is disposed adjacent to a write gap 326, where the P1 316 is spaced from the P2 318 by a distance in the x-direction at least twice the length of the write gap 326. Each of the readers 308 comprises a first shield S1 312, a second shield S2 314, and a magnetic sensor 328 disposed between the S1 312 and the S2 314. The magnetic sensor 328 may be a tunnel magnetoresistance (TMR) sensor, for example. In some embodiments, the distance 310 is measured from the write gap 326 to an MgO layer (not shown) of the magnetic sensor 328.

In the un-tilted configuration of FIGS. 3A-3B, the magnetic sensor 328 is offset or unaligned from the paired write gap 326 in the y-direction. A centerline 322 of the write gap 326 is offset a distance 333 from a centerline of the magnetic sensor 328, or vice versa. The distance 333 is between about 200 nm to about 2000 nm, such as about 1250 nm, and is chosen to give proper alignment when the SGV modules 300, 350 are statically rotated. While the magnetic sensor 328 is described herein as being offset from the paired write gap 326 by the distance 333, the write gap 326 may instead be offset from the paired magnetic sensor 328 by the distance 333. As such, the write gap 326 may be offset or unaligned from the paired magnetic sensor 328 in the −y-direction.

In the SGV module 300 of FIG. 3A, when writing data to a tape or other media, the tape moves over the writer 306 in the writing direction 330 (e.g., in the x-direction). In the SGV module 350 of FIG. 3B, when writing data to a tape or other media, the tape moves over the writer 306 in the writing direction 331 (e.g., in the −x-direction). Due at least in part to the distance 310 between the write gap 326 and the magnetic sensor 328 of a writer 306 and reader 308 pair, the writer 306 is able to write to the media, and the reader 308 is able to read the data to verify the data was written correctly when tilted, as shown by line 321. Thus, the writer 306 is able to write data to a portion of the tape, and the paired reader 308 is able to read verify the newly written portion of the tape immediately. As such, the SGV module 300 is able to write data to and read verify data from a tape concurrently. The SGV module 350, similar constructed, also has this immediate verify capability.

The SGV modules 300, 350 are each able to concurrently write and read data due in part to the separation distance 310 between the write gap 326 and the magnetic sensor 328 of a writer 306 and reader 308 pair. The write gap 326 and magnetic sensor 328 are spaced far enough apart that the amplitude of signals in the reader 308 that arise from coupling of magnetic flux from the paired writer 306 is reduced or substantially less than the readback signal of the reader 308 itself.

As used herein, the SGV modules 300, 350 being able to "concurrently" write and read data refers to the fact that both the writer 306 and the reader 308 are concurrently turned "on" or able to operate simultaneously with respect to various data written to a tape. However, it is to be noted that the writer 306 and the reader 308 are not "concurrently" operating on the same data at the same time. Rather, the writer 306 first writes data, and as the tape moves over the reader 308, the reader 308 is then able to read verify the newly written data as the writer 306 concurrently writes different data to a different portion of the tape. Furthermore, it is to be noted that a controller (not shown) is configured to operate the SGV modules 300, 350, and as such, the controller is configured to independently operate both the writer 306 and the reader 308. Thus, while the writer 306 is described as writing data and the reader 308 is described as reading the data, the controller enables the writer 306 to write and enables the reader 308 to read.

Figure 4:
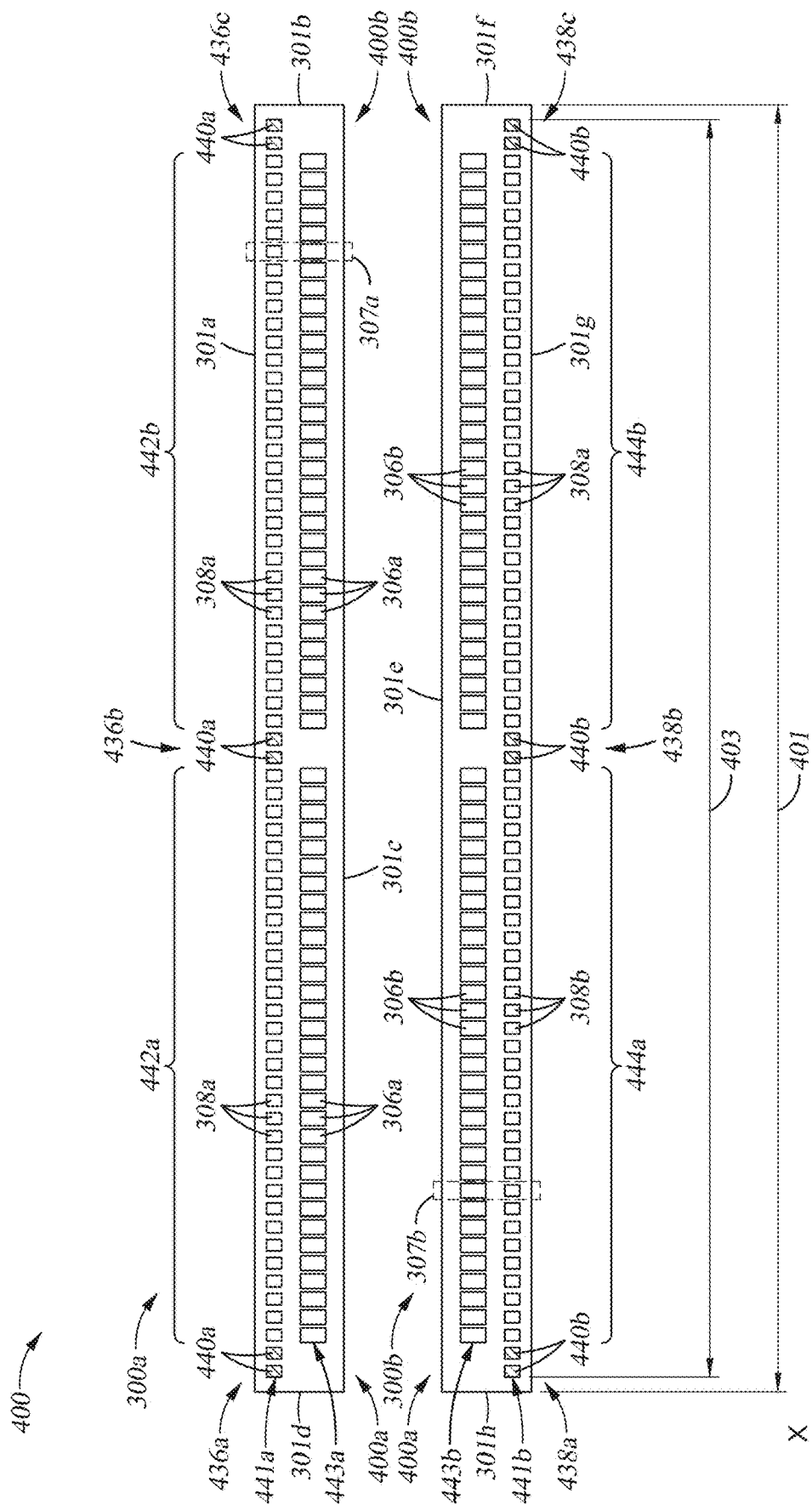

FIG. 4 illustrates a MFS view of a tape head 400 comprising two SGV modules 300a, 300b, according to one embodiment. The tape head 400 may be utilized within a tape drive comprising a controller, such as the captive tape drive or tape drive 100 of FIG. 1A. The tape head 400 may comprise one or more of the tape head modules 200 of FIG. 2. For the purpose of illustration and teaching, the disclosure will primarily describe the inclusion of multiple SGV modules in the various tape head assembly embodiments. It is noted that the tape head assembly embodiments of FIGS. 4-5D are not limited to SGV modules and other non-SGV head modules may be so mounted on the single beam of the tape head assembly as well. The SGV modules 300a, 300b may be the SGV module 300 of FIG. 3A, or the SGV modules 300a, 300b may be the SGV module 350 of FIG. 3B. The first and second SGV modules 300a, 300b are disposed adjacent to and are aligned with one another in the x-direction, the y-direction, and the z-direction. The first and second SGV modules 300a, 300b may be coupled together or spaced apart.

The first SGV module 300a comprises 64 writers 306a and 64 readers 308a. The 64 readers 308a are aligned in a first row 441a and the 64 writers 306a are aligned in a second row 443a parallel to the first row 441a. More specifically, the first SGV module 300a comprises a first set 442a of 32 writers 306a aligned or paired with 32 readers 308a, and a second set 442b of 32 writers 306a aligned or paired with 32 readers 308a. A pair of writers 306a and readers 308a may be referred to more generally as a data element 307 or a data element 307a. While the writers 306a and the readers 308a are aligned, the magnetic sensor of the readers 308a and the write gaps of the writers 306a may be offset or unaligned to allow the tape head 400 to dynamically tilt the first SGV module 300a, as discussed above. Each of the 64 writers 306a is configured to write data concurrently, and each of the 64 readers 308a is configured to read data concurrently. While each SGV module 300a, 300b is illustrated as comprising 64 writers 306a, 306b and 64 readers 308a, 308b, the SGV modules 300a, 300b may comprise a greater or fewer number of both writers 306a, 306b and readers 308a, 308b.

A plurality of servo readers 440a are aligned with the readers 308a. The plurality of servo readers 440a may also be referred to more generally as a data element 307. For instance, a first pair or group 436a of two servo readers 440a are disposed at a first end 400a of the first row 441a, a second pair or group 436b of two servo readers 440a are disposed between the first set 442a of readers 308a and the second set 442b of readers 308a, and a third group or pair 436c of two servo readers 440a are disposed at a second end 400b of the first row 441a opposite the first end 400a. While three groups 436a, 436b, 436c of two servo readers 440a are shown, each group 436a, 436b, 436c may comprise a greater or lesser number of servo readers 440a. Furthermore, the second row 443a of writers 306a is spaced apart between the first set 442a and second set 442b to accommodate for the space needed for the second pair 436b of servo readers 440a.

Each of the 64 writers 306a, 64 readers 308a, and 6 servo readers 440a is surrounded by a first continuous surface 301a of the module 300a, a second continuous surface 301b of the module 300a, a third continuous surface 301c of the module 300a, and a fourth continuous surface 301d of the module 300a, where the first, second, third, and fourth surfaces 301a-301d are connected together to form one continuous surface. In other words, the module 300a comprising 64 writers 306a, 64 readers 308a, and 6 servo readers 440a is only one module, rather than two or more modules coupled together. As such, the data elements 307 of the module 300a are all disposed between one substrate and one closure, such as the substrate 304 and closure 302 of FIGS. 3A-3B.

Similarly, the second SGV module 300b comprises 64 writers 306b and 64 readers 308b. The 64 writers 306b are aligned in a third row 443b and the 64 readers 308b are aligned in a fourth row 441b parallel to the third row 441b. The third and fourth rows 441b, 443b are disposed parallel to the first and second rows 441a, 443a, as the first and second SGV modules 300a, 300b are disposed adjacent to one another. While the second row 443a of writers 306a of the first SGV module 300a is disposed adjacent to the third row 443b of writers 306b of the second SGV module 300b, the first row 441a of readers 308a of the first SGV module 300a may instead be disposed adjacent to the fourth row 441b of readers 308b of the second SGV module 300b.

The second SGV module 300b comprises a first set 444a of 32 writers 306b aligned or paired with 32 readers 308b, and a second set 444b of 32 writers 306b aligned or paired with 32 readers 308b. A pair of writers 306b and readers 308b may be referred to as a data element 307 or a data element 307b. While the writers 306b and the readers 308b are aligned, the magnetic sensor of the readers 308b and the write gaps of the writers 306b may be offset or unaligned to allow the tape head 400 to dynamically tilt the second SGV module 300b, as discussed above. Each of the 64 writers 306b is configured to write data concurrently, and each of the 64 readers 308b is configured to read data concurrently.

A plurality of servo readers 440b are aligned with the readers 308b. For instance, a first group or pair 438a of two servo readers 440b are disposed at a first end 400a of the fourth row 441b, a second group or pair 438b of two servo readers 440b are disposed between the first set 444a of readers 308b and the second set 444b of readers 308b, and a third group or pair 438c of two servo readers 440b are disposed at a second end 400b of the fourth row 441b opposite the first end 400a. While three groups 438a, 438b, 438c of two servo readers 440b are shown, each group 438a, 438b, 438c may comprise a greater or lesser number of servo readers 440b. Furthermore, the third row 443b of writers 306b is spaced apart between the first set 444a and second set 444b to accommodate for the space needed for the second pair 438b of servo readers 440b.

Each of the 64 writers 306b, 64 readers 308b, and 6 servo readers 440b is surrounded by a first continuous surface 301e of the module 300b, a second continuous surface 301f of the module 300b, a third continuous surface 301g of the module 300b, and a fourth continuous surface 301h of the module 300b, where the first, second, third, and fourth surfaces 301e-301h are connected together to form one continuous surface. In other words, the module 300b comprising 64 writers 306b, 64 readers 308b, and 6 servo readers 440b is only one module, rather than two or more modules coupled together. As such, the data elements 307 of the module 300b are all disposed between one substrate and one closure, such as the substrate 304 and closure 302 of FIGS. 3A-3B.

While each SGV module 300a, 300b is shown as comprising 64 writers 306a, 306b and 64 readers 308a, 308b, the tape head 400 is not limited to comprising 64 data elements 307; rather, the tape head 400 may comprise any number of data elements 307. For example, in some embodiments, the tape head 400 may comprise a greater number of data elements 307 or a fewer number of data elements 307. Thus, the tape head 400 may comprise additional or fewer than 64 channels. In embodiments where the tape head 400 comprises 64 channels, the tape head 400 may operate in two different modes: (1) 32 channels or data elements 307; or (2) 64 channels or data elements 307. In both modes, the 32 channels or the 63 channels may be concurrently operable to write data to and read data from the tape in either mode.

Moreover, while two SGV modules 300a, 300b are shown and discussed, the tape head 400 may comprise only one module, two modules, or three modules. Regardless of the number of modules within the tape head 400, the tape head 400 may function in either a SGV mode or a legacy mode. For example, in embodiments where the tape head 400 comprises three modules, one or more modules may comprise only writers 306a, 306b (a write module (W)), and one or more modules may comprise only readers 308a, 308b (a read module (R)). In such embodiments, the three modules may have a W-R-W configuration, a R-W-R configuration, or any combination thereof.

In some embodiments, the first SGV module 300a writes data to and read verifies data from a tape when the tape moves in a first direction, such as in the y-direction, and the second SGV module 300*b* writes data to and read verifies data from a tape when the tape moves in a second direction opposite the first direction, such as in the −y-direction. In such embodiments, since only one SGV module 300*a* or 300*b* is writing and/or reading data at a time, the tape head 400 may be configured for upstream and downstream flying over the module 300*a*, 300*b* not currently in use. An example tape head or tape drive configured to enable upstream and/or downstream flying, as well as an example of a writer and a reader of a module being aligned along a center axis, is described in co-pending patent application titled "Tape Drive Configured to Enable Magnetic Media to Fly Above an Upstream or a Downstream Module," U.S. application Ser. No. 17/512,127, filed Oct. 27, 2021, assigned to the same assignee of this application, which is herein incorporated by reference.

While the readers 308*a*, 308*b* and the writers 306*a*, 306*b* of each SGV module 300*a*, 300*b* are divided into two sets 442*a*, 442*b*, 444*a*, 444*b*, each module 300*a*, 300*b* is one continuous module (i.e., not two modules of 32 data elements connected together). Each SGV module 300*a*, 300*b* has a total length 401 in the x-direction of at least 12 mm, such as about 13 mm to about 14 mm, such as about 13.6 mm. The distance 403 between the first servo reader 440*a* of the first pair 436*a* to the second servo reader 440*a* of the third pair 436*c*, and the distance 403 between the first servo reader 440*b* of the first pair 438*a* to the second servo reader 440*b* of the third pair 438*c*, is less than the length 401 of the first and SGV modules 300*a*, 300*b* and less than a width of a tape. However, the distance 403 in some embodiments may be about 5% to about 15% less than a width of the tape. Because each SGV module 300*a*, 300*b* comprises 64 writers 306*a*, 306*b* and 64 readers 308*a*, 308*b*, the each SGV module 300*a*, 300*b* may span the entire width of a tape, such as a tape having a width of about 0.5 inches, as each SGV module 300*a*, 300*b* has a length 401 greater than a width of a tape, which is discussed further below.

The wiring and the bond pads, and the spacing thereof, of the modules 300*a*, 300*b* is described in is described in U.S. application Ser. No. 17/849,510, filed Jun. 24, 2022, titled "High Concurrent Channels Magnetic Recording Head Having Same-Gap-Verify And High Density Interconnect," and assigned to the same assignee of this application, which is herein incorporated by reference.

Figure 5A:
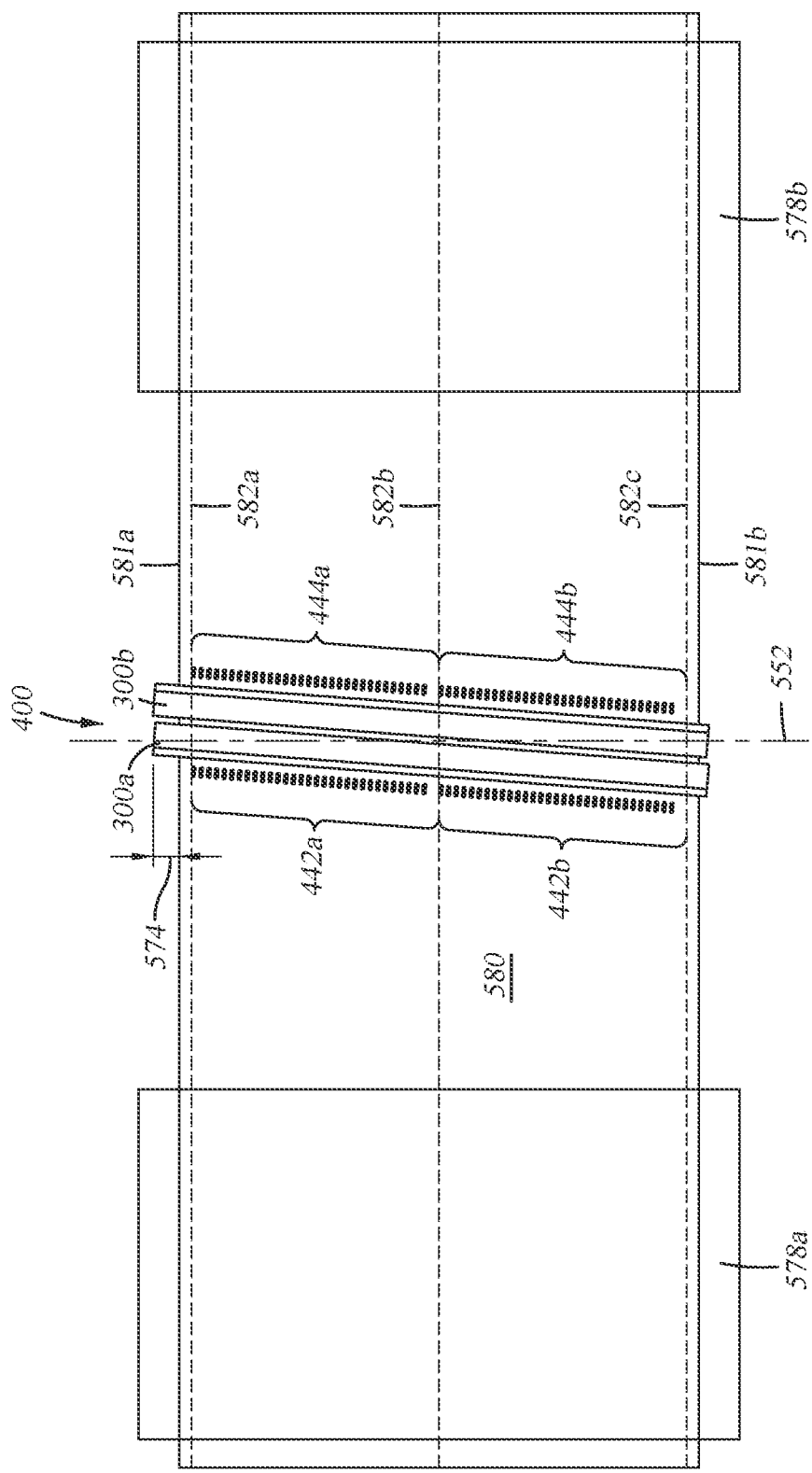
FIGS. 5A-5B illustrate the tape head of FIG. 4 writing to a tape, according to various embodiments.
Figure 5B:
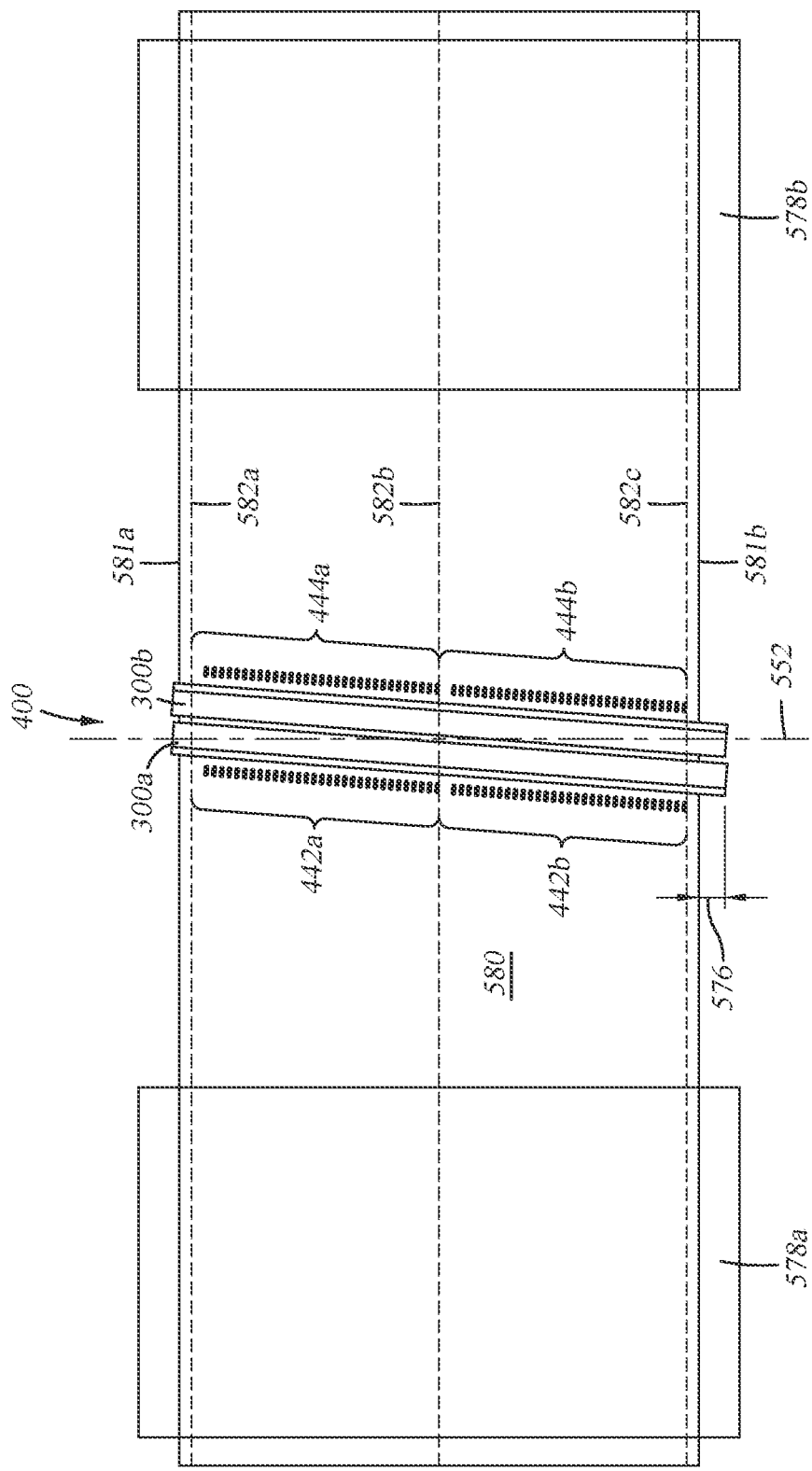

FIGS. 5A-5B illustrate the tape head 400 of FIG. 4 writing to a tape 580, according to various embodiments. FIG. 5A illustrates a first inbound wrap of the tape 580 (e.g., the tape 580 moving in the inbound direction or x-direction), and FIG. 5B illustrates a first outbound wrap of the tape 580 (e.g., the tape 580 moving in the outbound direction or −x-direction). The tape 580 is disposed on a first roller 578*a* and a second roller 578*b*, which are configured to move the tape 580 in the inbound and outbound direction. For the purposes of the descriptions of FIGS. 5A-5B, it is assumed the tape 580 has a width in the y-direction of 0.5 inches. The tape 580 is written to and/or read from in a serpentine manner. Thus, while only the first outbound and first inbound wraps are shown, the tape head 400 will be disposed at a plurality of locations over the tape 580.

The tape 580 comprises a plurality of data tracks (not shown) and three servo tracks 582*a*, 582*b*, 582*c* (collectively referred to as servo tracks 582). The tape head 400 is configured to write data to and read data from the plurality of data tracks, and the servo readers 440 of the tape head 400 are configured to read servo data or servo patterns, which is discussed further below, from the servo tracks 582. As shown in FIGS. 5A-5B, the tape head 400 is tilted from a central axis 522 about 1° to about 12°, such as about 5°±about 1°, when writing data to or reading data from the tape 580. While the tape head 400 is shown tilted in the clockwise direction, the tape head 400 may instead be tilted in the counter-clockwise direction.

The first sets 442*a*, 444*a* of writer 306*a*, 306*b* and reader 308*a*, 308*b* pairs of each SGV module 300*a*, 300*b* are disposed between the first servo track 582*a* and the second servo track 582*b*, and the second sets 442*b*, 444*b* of writer 306*a*, 306*b* and reader 308*a*, 308*b* pairs of each SGV module 300*a*, 300*b* are disposed between the second servo track 582*b* and the third servo track 582*c*. The plurality of data tracks are disposed between the first and second servo tracks 582*a*, 582*b* and between the second and third servo tracks 582*b*, 582*c*.

While not shown, the first groups 436*a*, 438*a* of servo readers 440*a*, 440*b* are configured to read the first servo track 582*a*, the second groups 436*b*, 438*b* of servo readers 440*a*, 440*b* are configured to read the second servo track 582*b*, and the third groups 436*c*, 438*c* of servo readers 440*a*, 440*b* are configured to read the third servo track 582*c*. As such, four servo readers 440*a*, 440*b* are configured to read from each of the servo tracks 582*a*, 582*b*, 582*c*, as each SGV module 300*a*, 300*b* comprises two servo readers 440*a*, 440*b* at each location corresponding to the servo tracks 582*a*, 582*b*, 582*c*.

At least two servo readers 440*a*, 440*b* of the tape head 400 are configured to read servo data from each servo track 582*a*, 582*b*, 582*c* at a time. For example, one servo reader 440*a* from the first pair 436*a* of the first SGV module 300*a* and one servo reader 440*b* from the first pair 438*a* of the second SGV module 300*b* may read the first servo track 582*a* at the same time, or both servo readers 440*a* from the first pair 436*a* of the first SGV module 300*a* (or both servo readers 440*b* of the first pair 438*a* of the second SGV module 300*b*) may read the first servo track 582*a* at the same time. While at least two servo readers 440*a*, 440*b* of the tape head 400 are configured to read servo data from each servo track 582*a*, 582*b*, 582*c* at a time, more than two servo readers 440*a*, 440*b* may be of the tape head 400 are configured to read servo data from each servo track 582*a*, 582*b*, 582*c* at a time. For instance, both servo readers 440*a*, 440*b* from both first groups 436*a*, 438*b* may be configured to read servo data from the first servo track 582*a*.

As shown in FIG. 5A, when the tape head 400 writes or reads data from the tape 580 in the first outbound direction (i.e., a leftmost position of the tape head 400), the tape head 400 overhangs a first edge 581*a* of the tape 580 a distance 574 of about 0.4 mm to about 0.8 mm in the y-direction. As shown in FIG. 5B, when the tape head 400 writes or reads data from the tape 580 in the first inbound direction (i.e., a right position of the tape head 400), the tape head 400 overhangs a second edge 581*b* of the tape 580 a distance 576 of about 0.4 mm to about 0.8 mm in the −y-direction. As the tape head 400 continues to write data to and read data from the tape 580, the overhang of the tape head 400 gradually lessens with each outbound and inbound wrap until the tape head 400 is centered over the tape 580 (shown in FIG. 6B). When the tape head 400 is centered over the tape 580, the tape head 400 overhangs both the first edge 581*a* and the second edge 581*b* of the tape 580 a distance of about 0.15 inches to about 0.2 inches.

Figure 6A:
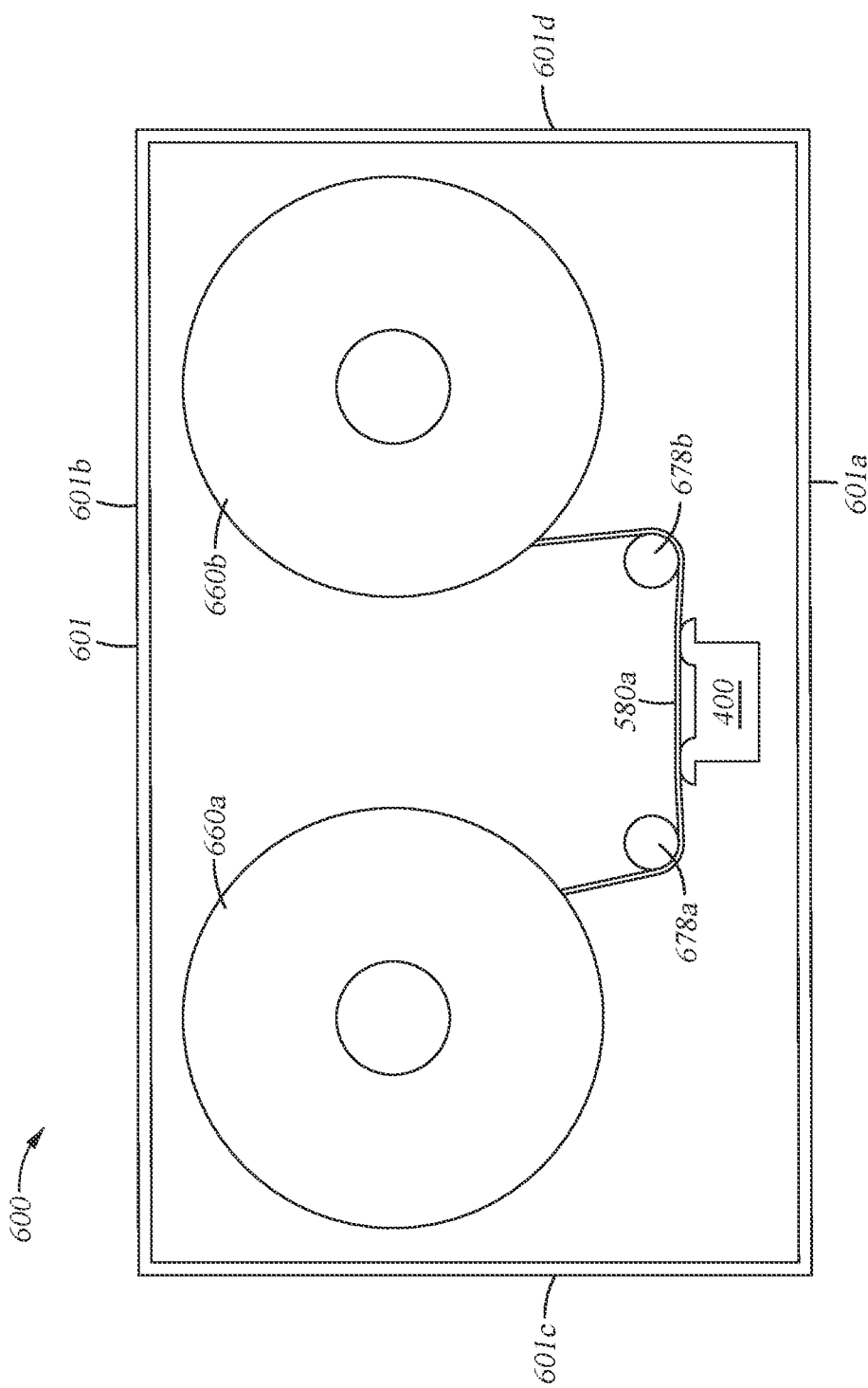
FIGS. 6A-6B illustrate views of a tape drive or captive tape drive comprising the tape head of FIGS. 4-5B, according to various embodiments.
Figure 6B:
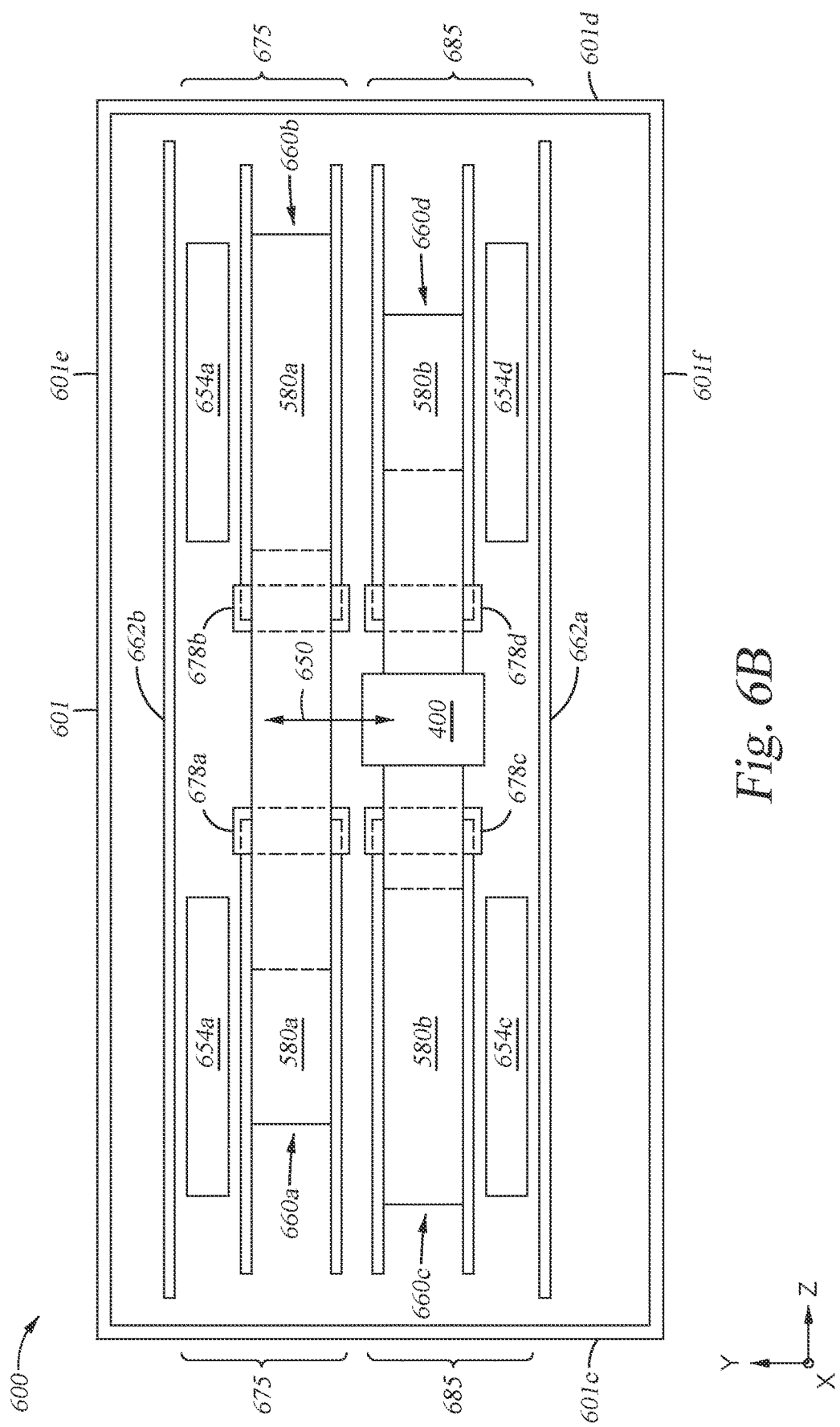

FIGS. 6A-6B illustrate views of a captive tape drive 600 comprising the tape head 400 of FIGS. 4-5B, according to various embodiments. FIG. 6A illustrates a top view of the captive tape drive 600, and FIG. 6B illustrates a cross-sectional view of the captive tape drive 600. The captive tape drive 600 may be the captive tape drive or tape drive 100 of FIG. 1A. The captive tape drive 600 may comprise the tape head module 200 of FIG. 2.

As shown in FIGS. 6A-6B, the captive tape drive 600 is enclosed within an enclosure 601. The enclosure 601 comprises a first surface 601a disposed adjacent to the tape head 400, a second surface 601b opposite the first surface 601a, a third surface 601c disposed between the first and second surfaces 601a, 601b, and a fourth surface 601d opposite the third surface 601c. The enclosure 601 further comprises a top surface 601e and a bottom surface 601f opposite the top surface 601e. The first, second, third, and fourth surfaces 601a-601d each individually have a height in the y-direction of about 2 inches. The third surface 601c and the fourth surface 601d each have a width in the x-direction of about 5.25 inches. The first and second surfaces 601a, 601 b each have a length in the z-direction of about 10 inches to about 16 inches.

The tape head 400 is disposed within the enclosure 601 between a plurality of rollers 678a-678d. The plurality of rollers 678a-687d may be, or include, the first and second rollers 578a, 578b of FIGS. 5A-5B. Two tape supply reels 660a, 660c (where the first tape supply reel 660a is disposed over the second tape supply reel 660c) and two tape take-up reels 660b, 660d (where the first tape take-up reel 660b is disposed over the second tape take-up reel 660d) are disposed adjacent to the plurality of rollers 678a-678d. While four rollers 678a-678d, two tape supply reels 660a, 660c, and two tape tape-up reels 660b, 660d are shown, the tape head 400 may comprise any number of rollers, any number of tape supply reels, and any number of tape take-up reels. For example, the tape head 400 may comprise just one tape supply reel and one tape take-up reel. Thus, the number of each of the rollers, tape supply reels, and tape take-up reels is not intended to be limiting. In some embodiments, the number of each of the rollers, tape supply reels, and tape take-up reels are multiples of two.

As shown in FIG. 6B, a lower assembly 685 and an upper assembly 675 are disposed between a first mounting structure 662a and a second mounting structure 662b. The upper assembly 675 is spaced from the lower assembly 685 by about 50 mm to about 75 mm. While not shown, electronics of the captive tape drive 600 are disposed below the first mounting structure 662a. One or more controllers (not shown) are coupled to the upper assembly 675 and the lower assembly 685, where the upper and lower assemblies 675, 685 may share a same common controller, or have separate, individual controllers. A distance between the first mounting structure 662a and the second mounting structure 662b in the y-direction is about 1.0 inch. The upper and lower assemblies 675, 685 may be removable, and may be referred to herein as "blades".

The upper assembly 675 comprises the first supply reel 660a, the first take-up reel 660b, a first motor 654a, a second motor 654b, a first roller 678a, and a second roller 678b. The first motor 654a is disposed between the second mounting structure 662b and the first supply reel 660a, and the second motor 654b is disposed between the second mounting structure 662b and the second supply reel 660b. The first roller 678a is disposed adjacent to the second roller 678b. Similarly, the lower assembly 685 comprises the second supply reel 660c, the second take-up reel 660d, a third motor 654c, a fourth motor 654c, a third roller 678c, and a fourth roller 678d. The third motor 654c is disposed between the first mounting structure 662a and the second supply reel 660c, and the fourth motor 654d is disposed between the first mounting structure 662a and the second take-up reel 660d.

The third roller 678c is disposed adjacent to the fourth roller 678d in the z-direction, and adjacent to the first roller 678a in the y-direction. The fourth roller 678d is disposed adjacent to the second roller 678b in the y-direction.

The upper assembly 675 is disposed over the lower assembly 685 in the y-direction. The tape head 400 is disposed between the first, second, third, and fourth rollers 678a-678d, like shown in FIG. 6A. The upper assembly 675 supports an upper tape 580a, where the upper tape 580a is configured to move back and forth in the z-direction between the first supply reel 660a and the first take-up reel 660b using the first and second motors 654a, 654b and the first and second rollers 678a, 678b. The lower assembly 685 supports a lower tape 580b, where the lower tape is configured to move back and forth in the z-direction between the second supply reel 660c and the second take-up reel 660d using the third and fourth motors 654c, 654d and the third and fourth rollers 678c, 678d.

The tape head 400 is configured to move up and down, via an actuator (not shown), in the y-direction between the upper assembly 675 and the lower assembly 685, as shown by arrow 650, in order to write data to and read data from both the upper tape 580a and the lower tape 580b. The tape head 400 may move about 170 μm to move between the upper and lower assemblies 675, 685. For example, while the tape head 400 is writing to or reading data from the upper tape 580a, the lower assembly 685 is controllable to move the lower tape 580b in order to find a specific location on the lower tape 580b where data needs to be written next or to find data previously written on the lower tape 580b (or vice versa). Additionally, if either the upper tape 580a, or the lower tape 580b is not currently in use, the captive tape drive 600 may be configured to move the not currently in use tape at a low speed, such as about 0.25 m/s to about 0.5 m/s, to minimize creep, tape dimensional stability (TDS) effects, or distortion of the tape.

While only one tape head 400 is shown, in some embodiments, the captive tape drive 600 may comprise two tape heads 400, where a first tape head is configured to write to the upper tape 580a and a second tape head is configured to write to the lower tape 580b. In such an embodiments, the two tape heads may share common electronics and a common controller, such that only one tape head is active at a time. In another embodiment, each tape head may comprise individual electronics and controllers such that the tape heads may work concurrently.

In one embodiment, the upper tape 580a and the lower tape 580b are the same type of media, having the same characteristics and/or purpose. For example, the upper tape 580a and the lower tape 580b may be from the same jumbo tape to have the best magnetic consistency. In another embodiment, the upper tape 580a and the lower tape 580b are different types of medias having different characteristics and/or purposes, such as having different magnetic properties. Both the upper tape 580a and the lower tape 580b may each individually have a total length in the z-direction of about 1200 meters to about 2000 meters, and may each individually have a width in the y-direction of about 0.5 inches.

Because the tape head 400 comprises 64 data elements, the tape head 400 only needs to move a small amount of about 175 μm in the y-direction to write data to and read data from the upper tape 580a and the lower tape 580b. Due to each of the upper and lower tapes 580a, 580b having a length of about 1200 meters or greater, a vast amount of data is able to be stored in the captive tape drive 600, for example, at least double the amount of data as compared to conventional tape drives due to having upper and lower tapes 580*a*, 580*b*. By being able to seek data or a location on either the upper or lower tape 580*a*, 580*b* (for example, the upper tape 580*b*) while concurrently writing data to or reading data from the other tape (for example, the lower tape 580*b*), the amount of time spent writing data to or reading data from both the upper and lower tapes 580*a*, 580*b* is greatly reduced. As such, the amount of data able to be stored in the captive tape drive 600 is significantly increased without impacting or slowing down the seeking process or the read and write process.

Figure 7A:
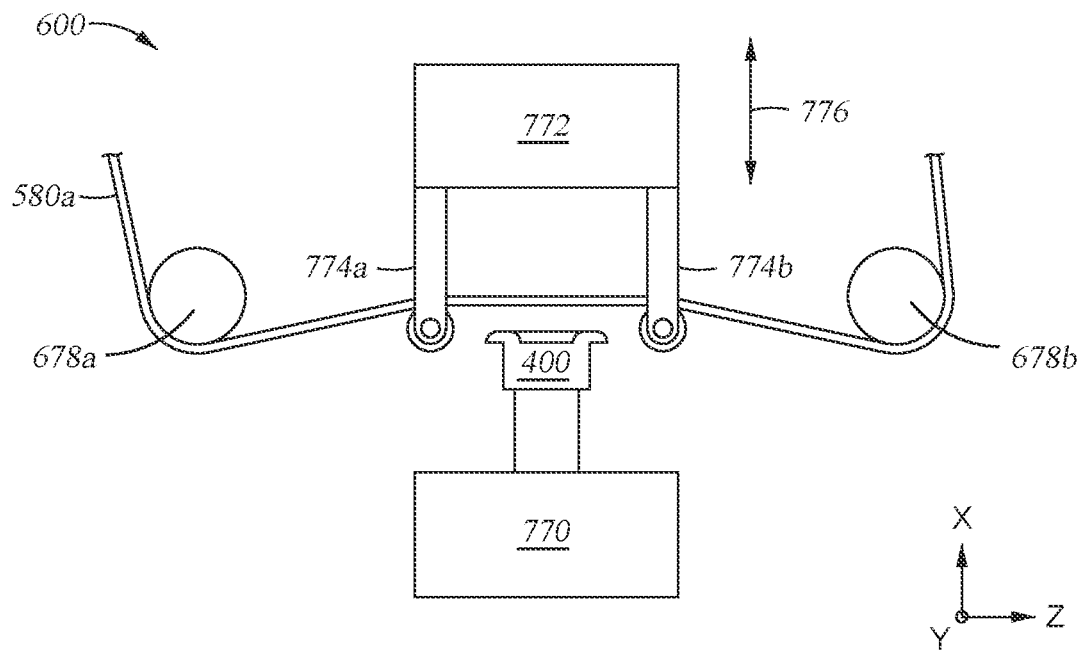
FIGS. 7A-7B illustrate how various actuators of the captive tape drive of FIGS. 6A-6B function in order to accurately move and position the tape head, according to one embodiment.
Figure 7B:
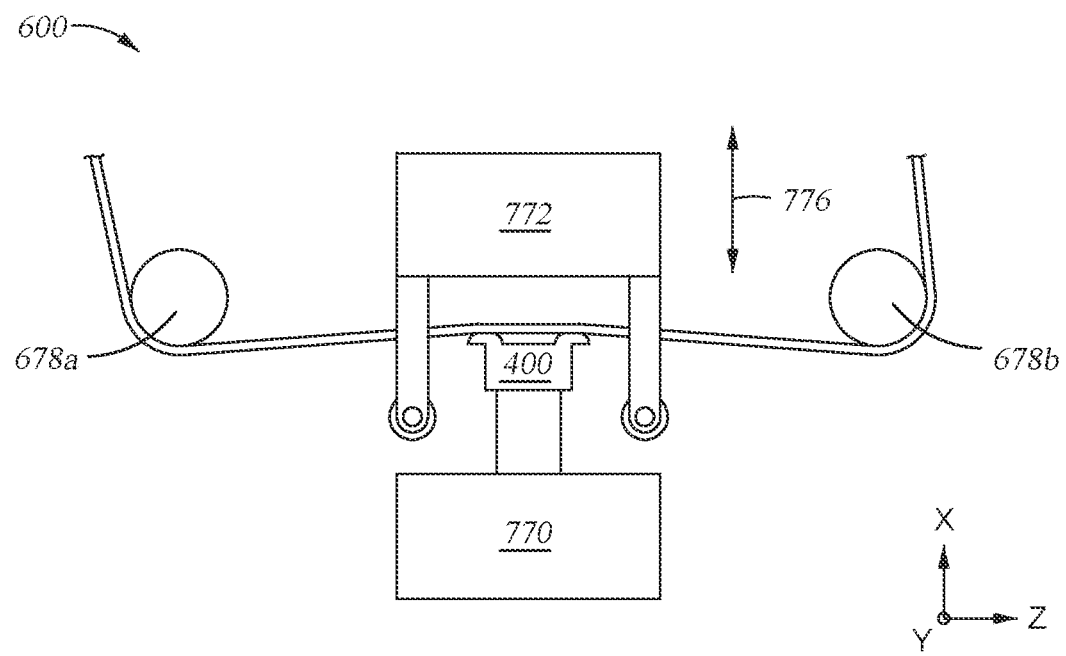

FIGS. 7A-7B illustrate how various actuators 770, 772 of the captive tape drive 600 of FIGS. 6A-6B function in order to accurately move and position the tape head 400, according to one embodiment. FIG. 7A illustrates the tape head 400 being in a position to move between the upper assembly 675 and the lower assembly 685, and FIG. 7B illustrates the tape head 400 contacting the upper tape 580*a* to write data to or read data from the upper tape 580*a*.

The tape head 400 is coupled to a first actuator 770. The first actuator 770 may be a VCM actuator or a stepper motor. The first actuator 770 is configured to move the tape head in the y-direction and the −y-direction between the upper assembly 675 and the lower assembly 685. The first actuator 770 is configured to move the tape head 400 a distance of about 50 mm. A second actuator 772 is disposed between the first roller 678*a* and the second roller 678*b* on the opposite side of the upper tape 580*a* than the tape head 400. The second actuator 772 may be a linear actuator. The second actuator 772 comprises a first bar 774*a* and a second bar 774*b*. While not shown, the tape head 400 itself may comprise one or more actuators that move the tape head 400 vertically up and down (i.e., the y-direction and the −y-direction) to follow tape jitter; and a rotational actuator to follow tape skew and TDS. Such actuators may be VCMs or a combination of VCMs and piezo-electric elements, as is well known.

As shown in FIG. 7A, the second actuator 772 is configured to move the first and second bars 774*a*, 774*b* in the x-direction, as shown by the arrow 776, in order to pull the tape 580*a* away from the tape head 400 so as to prevent the tape 580*a* from being damaged as the first actuator 770 moves the tape head 400 between the upper and lower assemblies 675, 685. The second actuator 772 is configured to move the tape 580*a* a distance of about 5 mm to about 10 mm. The second actuator 772 may be magnetically or stepper motor driven, for example. When the tape head 400 is in the correct position in the y-direction, the second actuator 772 is configured to move the first and second bars 774*a*, 774*b* in the −x-direction to release the tape 580*a*, allowing the tape head 400 to contact the tape 580*a* in order to write data to and read data from the tape 580*a*, as shown in FIG. 7B.

Therefore, utilizing a captive tape drive comprising a 64-channel, SGV tape head configured to write data to and read data from both an upper tape and a lower tape enables the amount of data to be stored in the captive tape drive to be at least doubled, as compared to conventional tape drives. Furthermore, by being able to seek data or a location on either the upper or lower tape while concurrently writing data to or reading data from the other tape, the amount of time spent writing data to or reading data, as well as seeking data, from both the upper and lower tapes is greatly reduced. As such, the amount of data able to be stored in the captive tape drive is significantly increased without impacting or slowing down the seeking process or the read and write process.

In one embodiment, a tape drive comprises an enclosure, an upper assembly disposed within the enclosure, the upper assembly comprising: a first supply reel, a first take-up reel, one or more first rollers disposed between the first supply reel and the first take-up reel, and a first tape, a lower assembly disposed adjacent to the upper assembly within the enclosure, the lower assembly comprising: a second supply reel, a second take-up reel, one or more second rollers disposed between the second supply reel and the second take-up reel, and a second tape, and a tape head disposed between the one or more first rollers and the one or more second rollers within the enclosure, wherein the tape head comprises one or more modules, each module comprising a plurality of writers and a plurality of readers.

The tape drive further comprises a first actuator configured to move the tape head in a first direction and a second direction opposite the first direction between the upper assembly and the lower assembly. The tape drive further comprises a second actuator configured to move one or more of the first tape or the second tape in a third direction perpendicular to the first direction and a fourth direction opposite the third direction. The tape head is configured to write data to or read data from the first tape, and wherein the tape drive is configured to simultaneously move the second tape to find data or a location on the second tape. The enclosure has a width of about 2 inches. The tape drive further comprises a first mounting structure and a second mounting structure, wherein the upper assembly and the lower assembly are disposed between the first and second mounting structures, and wherein a distance from the first mounting structure to the second mounting structure is about 1.0 inch. The plurality of writers is 64 writers, and wherein the plurality of readers is 64 readers. The tape head is configured to write data to each of the first and second tapes using the plurality of writers and to read verify the newly written data using the plurality of readers.

In another embodiment, a tape drive comprises an upper supply reel, an upper take-up reel disposed adjacent to the upper supply reel in a first direction, a first roller disposed adjacent to the upper supply reel, a second roller disposed between the upper take-up reel and the first roller, wherein the upper supply reel, the upper take-up reel, and the first and second rollers are configured to support a first tape, a lower supply reel disposed adjacent to the upper supply reel in a second direction perpendicular to the first direction, a lower take-up reel disposed adjacent to the lower supply reel in the first direction, a third roller disposed adjacent to the lower supply reel, a fourth roller disposed between the lower take-up reel and the third roller, wherein the lower supply reel, the lower take-up reel, and the third and fourth rollers are configured to support a second tape, and a tape head disposed between the first, second, third, and fourth rollers, wherein the tape head comprises one or more modules, each module comprising a plurality of writers and a plurality of readers.

The tape drive is configured to move each of the first tape and the second tape at a speed of about 0.25 m/s to about 0.5 m/s to prevent distortion of the first tape and the second tape. The tape drive further comprises a first actuator configured to move the tape head in the second direction and a third direction opposite the second direction between the first tape and the second tape, and a second actuator configured to move one or more of the first tape or the second tape in a fourth direction perpendicular to the second direction and a fifth direction opposite the fourth direction. The first actuator is configured to move the tape head a distance of about 170 µm, and wherein the second actuator is configured to move one or more of the first tape or the second tape a distance of about 5 mm to about 10 mm. The first actuator is a voice coil motor actuator, and wherein the second actuator is a linear actuator. The tape drive further comprises a first mounting structure, a second mounting structure, a first motor disposed between the upper supply reel and the first mounting structure, a second motor disposed between the upper take-up reel and the first mounting structure, a third motor disposed between the lower supply reel and the second mounting structure, and a fourth motor disposed between the lower take-up reel and the second mounting structure. The plurality of writers is 64 writers, and wherein the plurality of readers is 64 readers. The tape head is configured to write data to each of the first and second tapes using the plurality of writers and to read verify newly written data using the plurality of readers.

In yet another embodiment, a tape drive comprises an upper assembly, the upper assembly comprising: a first supply reel, a first take-up reel, one or more first rollers disposed between the first supply reel and the first take-up reel, and a first tape, a lower assembly disposed adjacent to the upper assembly, the lower assembly comprising: a second supply reel, a second take-up reel, one or more second rollers disposed between the second supply reel and the second take-up reel, and a second tape, a tape head disposed between the one or more first rollers and the one or more second rollers, wherein the tape head comprises two modules, each module comprising a plurality of writers and a plurality of readers, and wherein the tape head is configured to write data to each of the first and second tapes using the plurality of writers and to read verify newly written data using the plurality of readers, means for moving the tape head in a first direction and a second direction opposite the first direction, and means for moving one or more of the first tape or the second tape in a third direction perpendicular to the first direction and a fourth direction opposite the third direction.

The tape drive further comprises means for moving the first tape and a second tape at a speed of about 0.25 m/s to about 0.5 m/s to prevent distortion of the first tape and the second tape. The upper assembly and the lower assembly are configured to operate independently. The first tape and the second tape each individually have a width of about 0.5 inches and a length greater than or equal to about 1200 meters. The tape head is configured to write data to or read data from the second tape, and wherein the tape drive is configured to move the first tape to find data or a location on the first tape. The means for moving the tape head in the first direction and the second direction is configured to move the tape head about 170 µm, and wherein the means for moving one or more of the first tape or the second tape in the third direction and the fourth direction is configured to move the tape head about 5 mm to about 10 mm. The upper assembly, the first tape, the lower assembly, the second tape, the tape head, the means for moving the tape head in the first direction and the second direction, and the means for moving one or more of the first tape or the second tape in the third direction and the fourth direction are fully enclosed within the tape drive. The plurality of writers is 64 writers, and wherein the plurality of readers is 64 readers.

While the foregoing is directed to embodiments of the present disclosure, other and further embodiments of the disclosure may be devised without departing from the basic scope thereof, and the scope thereof is determined by the claims that follow.

What is claimed is:

1. A tape drive, comprising:
   an enclosure;
   an upper assembly disposed within the enclosure, the upper assembly comprising:
      a first supply reel;
      a first take-up reel;
      one or more first rollers disposed between the first supply reel and the first take-up reel; and
      a first tape;
   a lower assembly disposed adjacent to the upper assembly within the enclosure, the lower assembly comprising:
      a second supply reel;
      a second take-up reel;
      one or more second rollers disposed between the second supply reel and the second take-up reel; and
      a second tape;
   a tape head disposed between the one or more first rollers and the one or more second rollers within the enclosure, wherein the tape head comprises one or more modules, each module comprising a plurality of writers, a plurality of readers, or a plurality of writers and a plurality of readers; and
   a first actuator comprising one or more bars, the one or more bars being configured to move one or more of the first tape or the second tape towards and away from the tape head, wherein:
      the tape head is disposed on a first side of the first tape or the second tape,
      the first actuator is disposed on a second side of the first tape or the second tape opposite the first side, and
      the one or more bars of the first actuator are configured to extend to the first side of the first tape or the second tape.

2. The tape drive of claim 1, further comprising a second actuator configured to move the tape head in a first direction and a second direction opposite the first direction between the upper assembly and the lower assembly.

3. The tape drive of claim 2, wherein the first actuator is configured to move one or more of the first tape or the second tape in a third direction perpendicular to the first direction and a fourth direction opposite the third direction.

4. The tape drive of claim 1, wherein the tape head is configured to write data to or read data from the first tape, and wherein the tape drive is configured to simultaneously move the second tape to find data or a location on the second tape.

5. The tape drive of claim 1, wherein the enclosure has a width of about 2 inches.

6. The tape drive of claim 1, further comprising a first mounting structure and a second mounting structure, wherein the upper assembly and the lower assembly are disposed between the first and second mounting structures, and wherein a distance from the first mounting structure to the second mounting structure is about 1.0 inch.

7. The tape drive of claim 1, wherein the plurality of writers is 64 writers, and wherein the plurality of readers is 64 readers.

8. The tape drive of claim 1, wherein the tape head comprises a module comprising a plurality of writers and a plurality of readers, wherein the tape drive is configured to write data to each of the first and second tapes using the plurality of writers and to read verify newly written data using the plurality of readers.

9. A tape drive, comprising:
   an upper supply reel;
   an upper take-up reel disposed adjacent to the upper supply reel in a first direction;
   a first roller disposed adjacent to the upper supply reel;

a second roller disposed between the upper take-up reel and the first roller, wherein the upper supply reel, the upper take-up reel, and the first and second rollers are configured to support a first tape;
a lower supply reel disposed adjacent to the upper supply reel in a second direction perpendicular to the first direction;
a lower take-up reel disposed adjacent to the lower supply reel in the first direction;
a third roller disposed adjacent to the lower supply reel;
a fourth roller disposed between the lower take-up reel and the third roller, wherein the lower supply reel, the lower take-up reel, and the third and fourth rollers are configured to support a second tape;
a tape head disposed between the first, second, third, and fourth rollers, wherein the tape head comprises one or more modules, each module comprising 64 writers and 64 readers; and
a first actuator comprising one or more bars, the one or more bars being configured to move one or more of the first tape or the second tape towards and away from the tape head.

10. The tape drive of claim 9, wherein the tape drive is configured to move each of the first tape and the second tape at a speed of about 0.25 m/s to about 0.5 m/s to prevent distortion of the first tape and the second tape.

11. The tape drive of claim 9, further comprising:
a second actuator configured to move the tape head in the second direction and a third direction opposite the second direction between the first tape and the second tape, wherein the first actuator is configured to move one or more of the first tape or the second tape in a fourth direction perpendicular to the second direction and a fifth direction opposite the fourth direction.

12. The tape drive of claim 11, wherein the second actuator is configured to move the tape head a distance of about 170 µm, and wherein the first actuator is configured to move one or more of the first tape or the second tape a distance of about 5 mm to about 10 mm.

13. The tape drive of claim 11, wherein the second actuator is a voice coil motor actuator, and wherein the first actuator is a linear actuator.

14. The tape drive of claim 9, further comprising:
a first mounting structure;
a second mounting structure;
a first motor disposed between the upper supply reel and the first mounting structure;
a second motor disposed between the upper take-up reel and the first mounting structure;
a third motor disposed between the lower supply reel and the second mounting structure; and
a fourth motor disposed between the lower take-up reel and the second mounting structure.

15. The tape drive of claim 9, wherein the tape drive is configured to write data to each of the first and second tapes using the 64 writers and to read verify newly written data using the 64 readers.

16. A tape drive, comprising:
an upper assembly, the upper assembly comprising:
a first supply reel;
a first take-up reel;
one or more first rollers disposed between the first supply reel and the first take-up reel; and
a first tape;
a lower assembly disposed adjacent to the upper assembly, the lower assembly comprising:
a second supply reel;
a second take-up reel;
one or more second rollers disposed between the second supply reel and the second take-up reel; and
a second tape;
a tape head disposed between the one or more first rollers and the one or more second rollers, wherein the tape head comprises two modules, each module comprising 64 writers and 64 readers, and wherein the tape head is configured to write data to each of the first and second tapes using the 64 writers and to read verify newly written data using the 64 readers;
means for moving the tape head in a first direction and a second direction opposite the first direction; and
means for moving one or more of the first tape or the second tape in a third direction perpendicular to the first direction and a fourth direction opposite the third direction, the means for moving one or more of the first tape or the second tape comprising one or more bars configured to contact one of the first tape or the second tape, wherein:
the tape head is disposed on a first side of the first tape or the second tape,
the means for moving one or more of the first tape or the second tape is disposed on a second side of the first tape or the second tape opposite the first side, and
the one or more bars of the means for moving one or more of the first tape or the second tape are configured to extend to the first side of the first tape or the second tape.

17. The tape drive of claim 16, further comprising means for moving the first tape and the second tape at a speed of about 0.25 m/s to about 0.5 m/s to prevent distortion of the first tape and the second tape.

18. The tape drive of claim 16, wherein the upper assembly and the lower assembly are configured to operate independently.

19. The tape drive of claim 16, wherein the first tape and the second tape each individually have a width of about 0.5 inches and a length greater than or equal to about 1200 meters.

20. The tape drive of claim 16, wherein the tape head is configured to write data to or read data from the second tape, and wherein the tape drive is configured to move the first tape to find data or a location on the first tape.

21. The tape drive of claim 16, wherein the means for moving the tape head is configured to move the tape head about 170 µm, and wherein the means for moving one or more of the first tape or the second tape in the third direction and the fourth direction is configured to move one or more of the first tape or the second tape about 5 mm to about 10 mm.

22. The tape drive of claim 16, wherein the upper assembly, the first tape, the lower assembly, the second tape, the tape head, the means for moving the tape head in the first direction and the second direction, and the means for moving one or more of the first tape or the second tape in the third direction and the fourth direction are fully enclosed within the tape drive.

* * * * *